United States Patent [19]

Lee

[11] Patent Number: 4,708,025

[45] Date of Patent: Nov. 24, 1987

[54] SIMPLE DEVICE FOR THE ACTUATION OF AN ANIMAL-SHAPED TOY

[76] Inventor: James Lee, P.O. Box 10780, Taipei, Taiwan

[21] Appl. No.: 815,803

[22] Filed: Jan. 3, 1986

[51] Int. Cl.$^4$ ............... F16H 21/24; A63H 13/02
[52] U.S. Cl. ................................. 74/44; 446/353
[58] Field of Search .............. 74/44, 23, 25, 70; 446/278, 353, 352, 368

[56] References Cited

U.S. PATENT DOCUMENTS

| Re. 6,875 | 1/1876 | LaGrove | 464/352 |
|---|---|---|---|
| 665,249 | 1/1901 | Mayer | 74/44 |
| 845,595 | 2/1907 | Stutler | 74/44 |
| 1,049,345 | 1/1913 | Dolman | 464/353 |
| 2,194,537 | 3/1940 | Adams | 464/353 |
| 2,780,404 | 2/1957 | Kuehni | 74/25 |
| 2,929,253 | 3/1960 | Baldelli | 74/44 |

OTHER PUBLICATIONS

Aronson, Ralph, "Large Oscillation Mechanisms", in *Machine Design*, vol. 32, No. 23, p. 190ff, 11-10-60.

Primary Examiner—Rodney H. Bonck
Assistant Examiner—David A. Testardi

[57] ABSTRACT

The invention relates to a device for the actuation of an animal-shaped toy. It consists of a set of fix-tracked slide fittings which are connected with a driving device and whose female slide fitting part is fixed inside the toy body, so that the toy can move along a fixed track by means of such a simple device.

4 Claims, 7 Drawing Figures

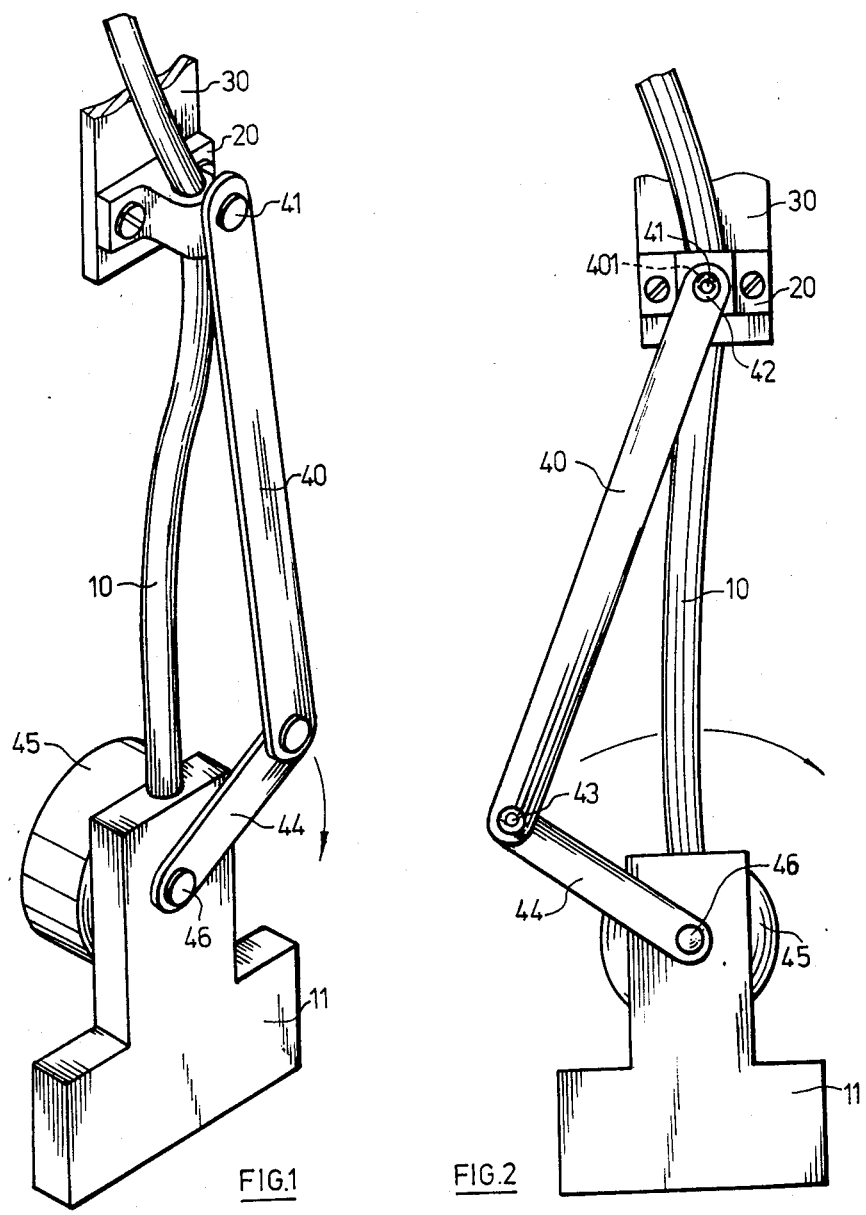

SIMPLE DEVICE FOR THE ACTUATION OF AN ANIMAL-SHAPED TOY

BACKGROUND OF THE INVENTION

Up to date, there are many devices for putting a limb of an animal-shaped toy in motion. However, the mechanisms are very complicated. Traditional devices usually use gears or cams as an actuation source and are composed with rectangular slide plate sets or rack and pinion sets as an activity track to act upon the toy. Approximately, ninety-five percent of reciprocating type toys apply the rack and pinion set to form a track and the rest of them apply a rectangular slide plate set. Therefore, traditional devices have the following drawbacks:

1. The activity track is a simple straight line whose motion is monotonous.
2. The manufacturing cost is high and assembly is relatively difficult.
3. The type of motion cannot be changed.

SUMMARY OF THE INVENTION

The principle of the invention is to simplify the actuation device of an animal-shaped toy and increase the toy's interesting essence. The major purpose of the invention is to improve the drawbacks of traditional devices. The second purpose of the invention is to provide a simpler device that gives the toy better motion. Another purpose of the invention is to provide an actuation device that makes the toy undergo sudden motion.

BRIEF DESCRIPTION OF THE DRAWINGS

FIG. 1 is a perspective view of the invention.
FIG. 2 is a front view of the invention.

DETAILED DESCRIPTION OF THE PREFERRED EMBODIMENTS

The invention is divided into two parts, a toy body and a fixed support. Both parts form a space to contain a motor fixed at the fixed support of the toy or a driving axle of an indirect driving source. A driving axle propels one end of a revolving lever and make the revolving lever rotate. Another end of the revolving lever pivots with a connecting lever which can push a female slide fitting component to slide reciprocatively on a male slide fitting component. The male slide fitting component is fixed at the fixed support of the toy and the female slide fitting component is fixed in the interior of the toy so that the toy will expose reciprocatively from the background which is formed by the fixed support of the toy.

The characteristics of the invention, as the Figures shown, is to equip a male slide fitting component 10 having a cylindrical rod as a base. The male slide fitting component 10 is fixed during sliding activity,. In addition, the male slide fitting component 10 bends toward the right or the left with a constant curved radius R or continuously bends in different directions alternately.

The male slide fitting component 10 is mounted on a support bracket 11 and the other end of the component 10 is a free beam.

Figure 3:
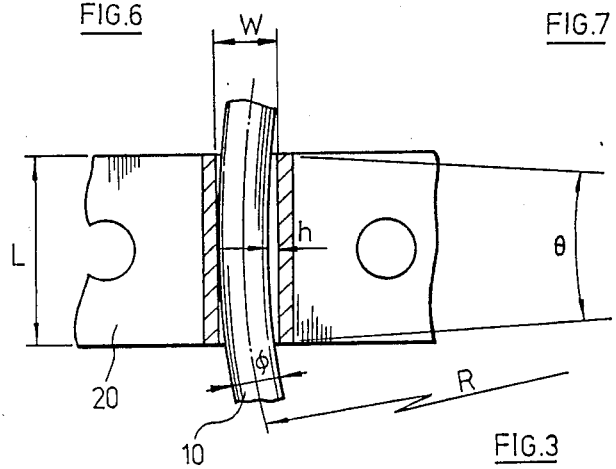
FIG. 3 is a front view of the slide fitting set.

The outside of the male slide fitting component 10 is encased by a female slide fitting component 20 with width L and bore diameter W. The width L and bore diameter W of female slide fitting component 20, the diameter $\phi$, and curved radius R, as FIG. 3 shown, must have the following relationship:

$$L = 2R \times \text{Sin}(\theta/2) \qquad 1.$$

Therefore, the smaller the included angle $\theta$ is the smaller the width L of female slide fitting component is.

$$h \cong (L^2 + 4h^2)/(8R) \qquad 2.$$

whereon, h is the length defined by the relation of the positive rate with square L and the negative rate with R. Therefore, as the curved radius R increases to approach a straight line, the h value decreases. Since the bore diameter W of the female slide fitting component 20 is loosely adapted with male slide fitting component 10, thus, $$W \cong \phi + h \qquad 3.$$

based on the relationships 2 and 3. It can be understood that as the R value increases, the h value and the corresponding bore diameter W of female component 20 decreases.

The female slide fitting component 20 is fixed to the toy body 30. Furthermore, the female slide fitting component 20, as FIGS. 4-7 shown, has a screw hole 21 to let a pivot stud 41 pivot with a connecting lever 40 on the female slide fitting conponent 20. A washer 42 is installed between the pivot stud 41 and the connecting lever 40 to increase the properties of sliding. Similarly, a washer 42 also may be installed between the connecting lever 40 and female slide fitting component 20 in the same way, although it is omitted in the Figures.

The axle hole 401 of the connecting lever 40 is always greater than the axle diameter of the pivot stud 41 and it is recommended that the bore diameter will be greater than 1⅓ times the axle diameter of the pivot stud 41. The lower end of the connecting lever 40 pivots with a revolving lever 44 by means of another stud 43. The relationship between the stud hole of the lower end of the connecting lever 40 and the stud 43 is similar to that of the connecting lever 40 and the stud 41 of the female slide fitting component 20 in that the stud hole of the connecting lever 40 is always greater than the diameter of the stud 43.

As described below, the special structure can make the female slide fitting component 20 produce a sudden jumping effect as soon as the revolving lever 44 revolves to top dead center.

Figure 4:
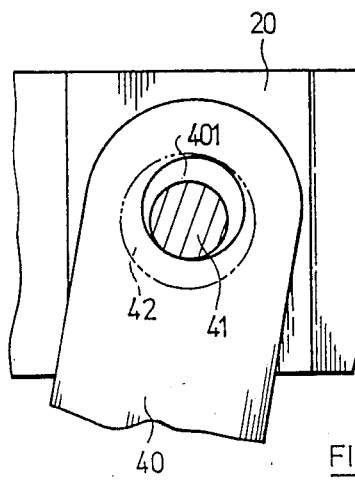
FIG. 4 is a front view of the portion of the pivot point of a connecting lever to show the detailed structure of the pivot axle and pivot hole.
Figure 5:
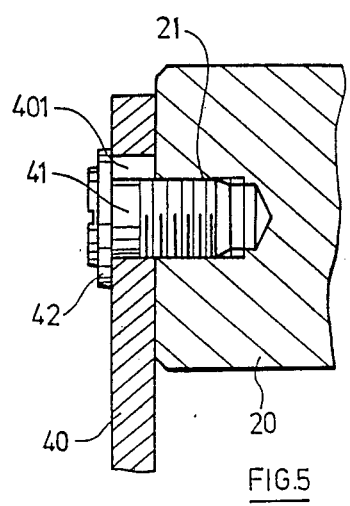
FIG. 5 is the side view of FIG. 4.
Figure 6:
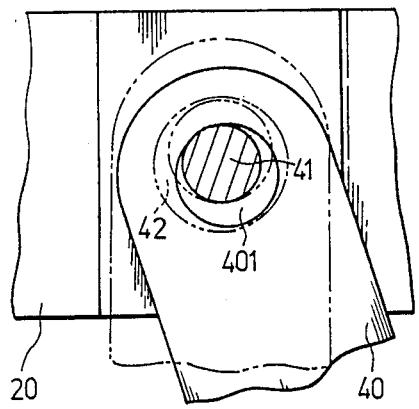
FIG. 6 is a front view of a motion demonstration of the connecting lever and a slide fitting component.
Figure 7:
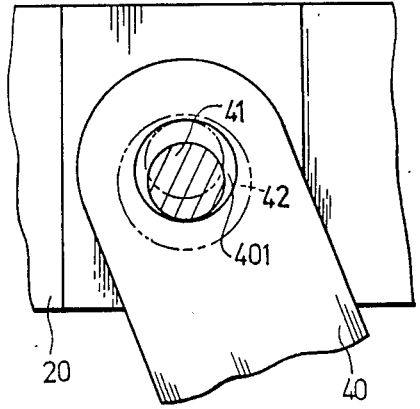
FIG. 7 is another front view of a similar motion demonstration.

The activity in sequence, as FIGS. 4 and 6-7 shown, demonstrate the position shifts of the upper end of the connecting lever 40.

As FIG. 2 shows, it can be seen that the revolving lever 44 is pivoted at the shaft 46 of the speed reduction motor 45 and driven by the speed reduction motor 45 to rotate. Because the female slide fitting element 20 is located above the motor 45, there are always a downward gravitational force.

While the revolving lever 44 revolves and approaches top dead center, as FIG. 4 shown, the stud 41 is pushed and lifted by the lower edge of the stud hole 401 of the connecting lever 40. As the revolving lever 44 passes top dead center, the connecting lever 40 is pulled downward, as FIG. 6 shows. At this moment, the stud 41 stays in the air (the initial velocity of a free falling body is zero), and the lower edge of the stud hole 401 of the connecting lever 40 continues downward and then separates from the stud 41. However, the pivot stud 41 then falls downward due to its own gravitational force and undergoes constant acceleration. Therefore, the displacement will increase rapidly and will be greater than the vertical displacement of the stud hole 401 of the connecting lever 40 in a certain time e.g. the stud 41 contacts the lower edge of the stud hole 401 again and is beared by the lower edge of the stud hole 401 and then rotates together with the stud hole 401.

Because the displacement track of the stud hole 401 is a circle, the pivot stud 41 must collide at the left side edge of the stud hole 401. When the pivot stud 41 falls down freely and collides with the stud hole 401, the stud 41 will roll down to the vertical position of the lower edge of the stud hole 401 immediately. In that moment, while the stud 41 is falling and rolling, the stud 41 leaves the regular track of the stud hole 401 and produces the special trembling phenomenon. There is a connection among the pivot stud 41, the female slide fitting component 20 and the toy body 30 so that it is very obvious to see the trembling phenomenon in the body due to the amplification effect of the height of the toy and the length of the connecting lever.

Because the pivot design for upper end and lower end stud holes of the connecting lever 40 can apply the same way as above-mentioned, each trembling motion can be superposed at different ranges and make the toy act with various characteristics.

To design a snake-shaped toy, for example, and to apply the device of the invention, one can install the motor 45 inside a bamboo cage in which is fixed a male slide fitting component 10. A female slide fitting component 20 make the snake head zigzag and lift slowly until it reaches the highest point. Then the snake head will suddenly twist and peck just like a bird does and then draw back to the bamboo cage. The motion device gives players lots of fun which cannot be obtained from a traditional device.

As above-described, the invention not only provides a simple device to make a toy have various characteristics in its activity but it also reduces the cost of manufacturing and assembling. These effects cannot be reached by the traditional device. The male slide fitting component 10 of the invention can be a straight line type or a semicircular type. Therefore, the activity track of the toy can be changed only by changing the shape of the male slide fitting component 10.

I claim:

1. A device for the actuation of an animal-shaped toy, said animal-shaped toy being divided into a toy body and a fixed support in such a manner that the fixed support and the interior of the toy body together define a space to contain the following components: a driving device having a drive shaft; a revolving lever means having first and second ends, the first end of which is fixed to the drive shaft; a connecting lever having first and second ends, the first end of which is pivotally connected with the second end of the revolving lever means; a male slide fitting component having one fixed end and another end that constitutes a free beam; a female slide fitting component which is loosely pivotally connected with the second end of the connecting lever and fixed to the interior of the toy body; a bore in the female slide fitting component which permits the female slide fitting component to slide along the male slide fitting component for reciprocal movement thereon; wherein the loosely pivoted connection between the connecting lever and the female slide fitting component is characterized by: a pivot stud fixed to the female slide fitting component, and a pivot hole in the connecting lever defining a circumferential edge which loosely surrounds the pivot stud, whereby, when the driving device drives the revolving lever means to cause the female slide fitting component to slide reciprocally on the male slide fitting component by means of the connecting lever, the pivot stud fixed to the female slide fitting component separates from the circumferential edge of the pivot hole in the connecting lever as the revolving lever means passes a top dead center position, and then reengages the circumferential edge of the pivot hole to produce a sudden collision which will be apparent on the toy body as a funny trembling effect.

2. A device for the actuation of an animal-shaped toy according to claim 1, wherein the male slide fitting component is a straight rod.

3. A device for the actuation of an animal-shaped toy according to claim 1, wherein the connecting lever and the revolving lever means are loosely pivotally connected to each other.

4. A device for the actuation of an animal-shaped toy according to claim 1, wherein the dimensions of the male and female slide fitting components are related according to the expression:

$$L = 2Rx \sin(\theta/2)$$

Where L is the length of the bore in the female slide fitting component, R is a radius of curvature of the portion of the male slide fitting component on which the female slide fitting component slides, and $\theta$ is the included angle defined by the length L and the radius R.

* * * * *